United States Patent [19]

Kawamura

[11] Patent Number: 5,595,580
[45] Date of Patent: Jan. 21, 1997

[54] DIESEL PARTICULATE FILTER AND CONTROL DEVICE THEREFOR

[75] Inventor: Hideo Kawamura, Samukawa-machi, Japan

[73] Assignee: Isuzu Ceramics Research Institute Co., Ltd., Kanagawa-ken, Japan

[21] Appl. No.: 440,336

[22] Filed: May 12, 1995

[30] Foreign Application Priority Data

May 12, 1994 [JP] Japan .................................. 6-122989
May 12, 1994 [JP] Japan .................................. 6-122990

[51] Int. Cl.⁶ .................................................. B01D 29/62
[52] U.S. Cl. ........................... 55/288; 55/301; 55/312; 55/385.3; 55/DIG. 30; 60/311; 123/198 E
[58] Field of Search ............................. 55/212, 213, 270, 55/274, 282, 283, 288, 301, 312, 523, 385.3, DIG. 10, DIG. 30; 60/288, 311; 123/198 E; 422/174, 178

[56] References Cited

U.S. PATENT DOCUMENTS

| | | | |
|---|---|---|---|
| 4,276,066 | 6/1981 | Bly et al. | 55/288 X |
| 4,544,388 | 10/1985 | Rao et al. | 55/282 |
| 5,140,811 | 8/1992 | Minami et al. | 60/288 X |
| 5,212,948 | 5/1993 | Gillingham et al. | 55/DIG. 30 |
| 5,228,891 | 7/1993 | Adiletta | 55/523 X |
| 5,293,742 | 3/1994 | Gillingham et al. | 60/288 |
| 5,345,762 | 9/1994 | Lutze | 60/288 |
| 5,357,755 | 10/1994 | Gillingham et al. | 60/288 |
| 5,398,503 | 3/1995 | Danno et al. | 60/311 X |
| 5,423,904 | 6/1995 | Dasgupta | 55/385.3 X |
| 5,458,673 | 10/1995 | Kojima et al. | 55/283 X |

Primary Examiner—Richard L. Chiesa
Attorney, Agent, or Firm—Staas & Halsey

[57] ABSTRACT

There is disclosed a diesel particulate filter for collecting and burning particulates and exhaust gases of a diesel engine and a controlled device therefor. The diesel particulate filter includes a wire net of electric resistance metal fastened to a main filter to burn the particulates collected by the main filter in the exhaust gases of the diesel engine. There is included a bypass pipe which constitutes a sub-filter and which is disposed within a filter case. The bypass pipe is provided with an open-close valve in the vicinity of an inlet thereof. A cylindrical main filter made by laminating long fibers of ceramics is disposed between the bypass pipe and the filter case. The wire net of electric resistance metal for heating the main filter is fastened on one surface of the main filter for receiving the exhaust. A reinforcing net-like plate of a heat resistant metal is fastened on the other surface of the main filter for releasing the exhaust.

6 Claims, 4 Drawing Sheets

DIESEL PARTICULATE FILTER AND CONTROL DEVICE THEREFOR

DETAILED DESCRIPTION OF THE INVENTION

1. Industrial Applicability

The present invention relates to a diesel particulate filter for collecting and burning particulates in exhaust gases of a diesel engine and a control device therefor.

2. Prior Art

Since the diesel engine employs a heterogeneous combustion in which fuel is injected into air elevated in temperature by heat insulating compression to effect combustion, there existed a problem that less carbon monoxide is contained in exhaust but a large amount of nitrogen oxide (NOx) and particulates (mainly, carbon) are contained.

For preventing such particulates from being released into atmosphere, a particulate filter has been developed in which a filter is mounted in an exhaust gas flow passage to filtrate and burn exhaust gases for purification.

The combustion of particulates collected by the filter can be preferably accomplished always during the running of a vehicle. For burning the particulates in a simpler manner, it is desired that the combustion takes place in a state where smoke is hard to generate, for example, when the vehicle is in a stopped state, or in an idling state. However, since, when the combustion takes place, a heater is energized, a considerable amount of power is consumed. In the state where the engine is in an idling state, electric quantities for generation of power are so small that carrying out the combustion of particulates is considerably difficult.

The conventional particulate filter had a problem in that filters are arranged in the whole exhaust flow passage, and therefore, when the filter is heated with electric heat, the filter is cooled by exhaust failing to perform satisfactory combustion. Particularly, in the case where the combustion is carried out in the idling state, the temperature of exhaust gases is so low that the filter is difficult to be satisfactorily heated for the reason above. Thus, a problem of an incomplete combustion of particulates is more serious.

Further, in the case where the operation of burning particles is let to a driver, there exists an inconvenience that the driver unnecessarily frequently performs the burning operation, and that the driver forgets the burning operation and as a result the filter becomes clogged to bring forth an unexpected situation.

Problem to be solved by the Invention

The present invention has been accomplished to cope with the foregoing. A first object of the present invention is not to cool a main filter by exhaust gases when particulates are burned by a main filter even if the engine is operated in any mode; a second object of the present invention is to detect a clogging of a main filter to automatically perform burning of particulates; a third object of the present invention is to prevent exhaust gases not filtrated even when particulates are burned from being released into atmosphere; a fourth object of the present invention is, in the case where a clogging of a main filter extremely progresses, to perform burning of particulates irrespective of any state of the engine and the like; and a fifth object of the present invention is to provide a means for informing a driver an occurrence of a clogging state when not under environment wherein a clogging of a main filter occurs so that burning is not suitable. This enables a complete combustion of particulates, an automatic combustion of particulates under the managed environment, and enables, when not under environment wherein a clogging of a filter occurs so that burning is not suitable, execution of combustion as soon as moving into a managed yard so as to always maintain a filter in a good state.

Means for Solving the Problem

For achieving the aforementioned objects, the present invention is constructed as set forth in claims.

Function

In the particulate filter according to the present invention, a main filter is disposed within a channel of exhaust gases from the internal combustion engine, and a bypass pipe is disposed in the main filter and provided with a bypass valve and a sub-filter. filter. The bypass pipe has substantially the same inside diameter as that of an exhaust pipe. The bypass valve provided on the bypass pipe is opened and the main filter is energized when the collected particulates in the main filter are burned. Since the main filter is energized to burn particulates cooling of the main filter by exhaust gases is suppressed under whatever mode the engine is.

Further, in the particulate filter according to the present invention, when the exhaust gas pressure exceeds a first predetermined value, judgement is made by a signal of the exhaust pressure sensor provided on an inlet of the main filter that a clogging caused by particulates occurred. Then a predetermined electric power is automatically applied to a heater to perform burning of particulates in the main filter. Accordingly, it is possible to avoid inconveniences such that excessive burning is carried out, and conversely, a clogging occurs in the main filter because the driver forgets burning.

Further, in the particulate filter according to the present invention, particulates (mainly, carbon) are accumulated in an amount in excess of a predetermined value on a resistance element to decrease a value of electric resistance. When the value of electric resistance is less than a predetermined value, judgement is made such that the main filter becomes clogged with particulates. Upon confirmation of an idling state, a predetermined amount of paper is automatically supplied to burn particulates.

Moreover, when the particulates are burned in the main filter, the exhaust gases are passed through the bypass pipe provided with a sub-filter. It is therefore possible to avoid an inconvenience such that exhaust gases not filtrated during the burning of particulates are released into atmosphere.

DETAILED DESCRIPTION OF THE PREFERRED EMBODIMENTS

First Embodiment

An embodiment of the present invention will be described hereinafter with reference to the drawings.

Figure 1:
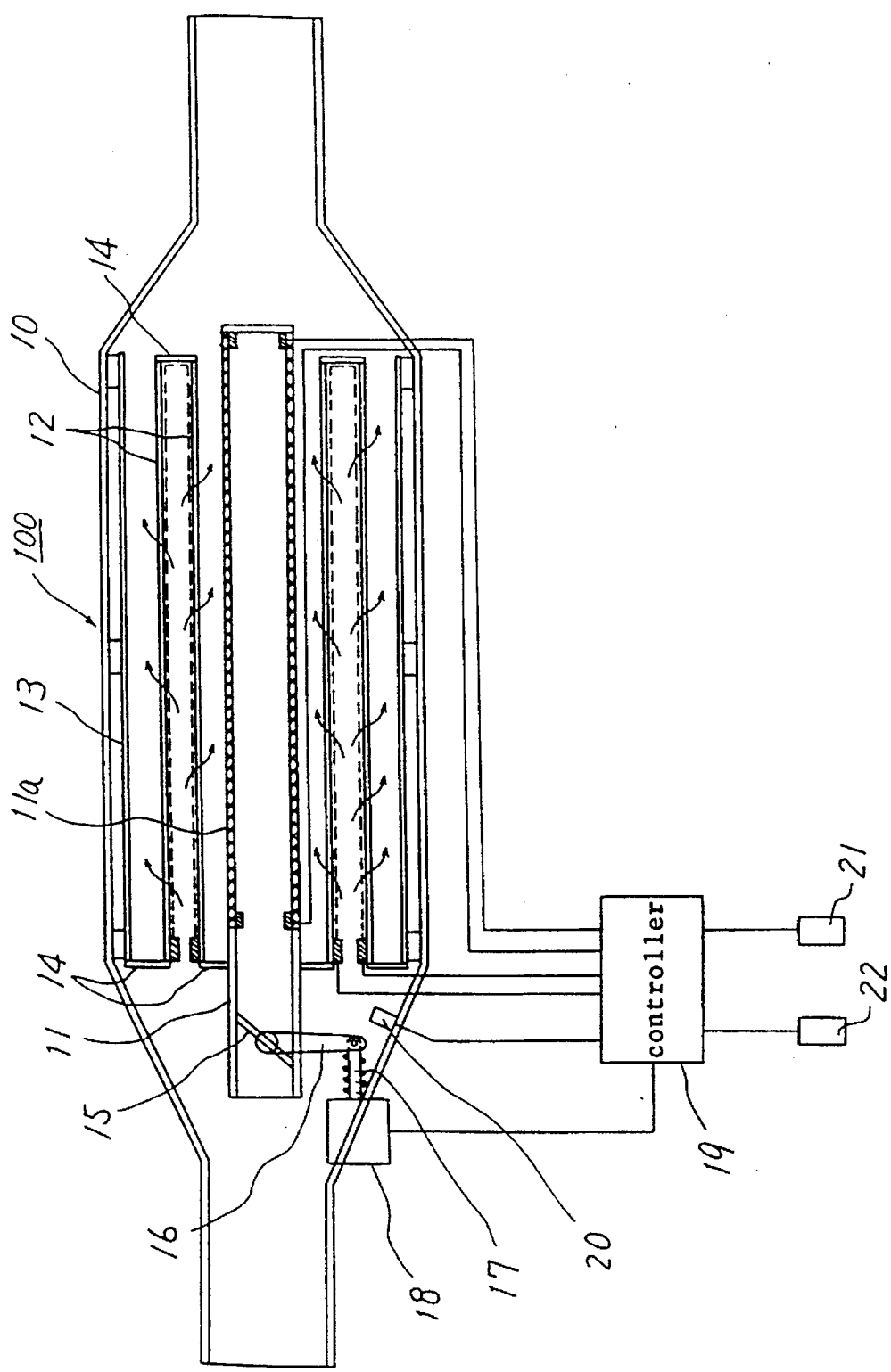
FIG. 1 is a sectional view showing the construction of a diesel particulate filter according to first embodiment of the present invention.

FIG. 1 is a sectional view of a particulate filter according to the first embodiment. As shown in FIG. 1, in a particulate filter 100 according to the present embodiment, a cylindrical bypass pipe 11 is disposed in a central portion within a heat resistant steel filter case 10, externally thereof is disposed a cylindrical laminated main filter 12 of a double co-axial tube construction, and further externally thereof is disposed a cylindrical exhaust pipe 13. The main filter 12 is made to be cylindrical in a section like a petal.

At a downstream portion of the bypass pipe 11 is formed a sub-filter 11a. The sub-filter 11a is constituted by a heat resistant metal pipe or a conductive ceramics pipe having a number of irregularly bent pores. In the case where the sub-filter 11a is formed of metal, Fe containing Ni and Cr is used on the surface of which is coated with ceramic. SiC can be used as a ceramic material.

In the bypass pipe 11, an inlet portion and a sub-filter portion can be constituted by materials different from each other. Alternatively, the whole bypass pipe 11 can be also constituted by the same material.

The main filter 12 comprises a heat resistant metal plate bored with a number of holes of air permeability are disposed, a ceramic fiber laminated body formed by superposing long fibers of ceramics which functions as a filter and wire net formed of heat resistant metal using Ni-Cr as main raw material are laminated. The ceramic fiber laminated body and the metal plate are laminated on the heat resistant metal plate and partly fastened. The heat resistant metal plate is positioned at a downstream layer in the exhaust flow.

A ceramic net-like construction plate can be used in place of a heat resistant metal plate. Further, a fiber composite body formed of heat resistant metal fiber can be used in place of the ceramic fiber laminated body.

Annular closed plates 14 for controlling a flow of exhaust gases are arranged between left end of the bypass pipe 11 and left end of the inner tube of the main filter 12, between left end of the outer tube of the main filter 12 and left end of the exhaust pipe 13, and between right ends of inner and outer tubes of the main filters 12.

A bypass valve 15 for controlling passage/interception of exhaust gases is provided in the vicinity of an inlet of the bypass pipe 11. The bypass valve 15 is opened and closed by an actuator 18 through a valve operating arm 16 against of a force of the spring 17. The operation of the actuator 18 is controlled by a controller 19. An exhaust pressure sensor 20 for detecting pressure of exhaust gases on the inlet side is connected to the controller 19.

Normally, the bypass valve 15 is closed while particulates are collected by the main filter 12 and exhaust gases do not pass through the bypass pipe 11. Exhaust gases come from the left side in the drawing, and the exhaust gases are fed between outer and inner tube of the main filters 12, pass through the main filter 12, as shown by the arrows and thence are discharged outside of the main filter 12, as shown by arrows.

When the controller 19 receiving output signals of the exhaust pressure sensor 20 judges that the combustion of particulates is necessary from these signals, the bypass valve 15 is opened by the actuator 18, and electric power is applied to the wire net laminated on main filter 12 for a fixed period of time to burn the particulates by the main filter 12. Thereafter, the bypass valve 15 is closed or slightly opened, under which state a small amount of air may flow into the bypass pipe 11, and electric power is applied to the sub-filter 11a to burn the particulates.

If a detected value by the exhaust pressure sensor 20 exceeds a given value, an emergency valve is opened, irrespective of the state of the engine and a seat belt, to permit exhaust gases to flow out.

Figure 2:
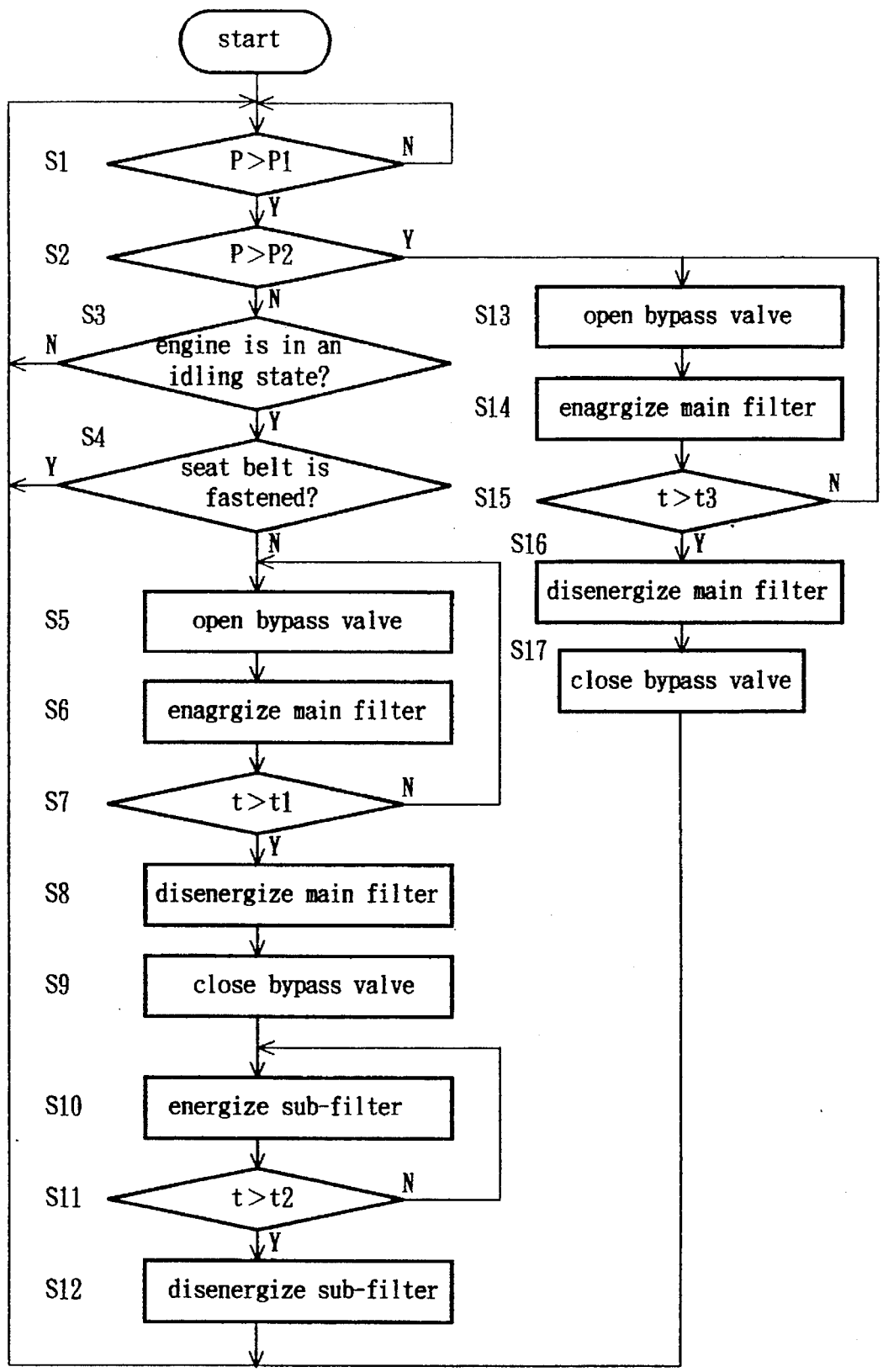
FIG. 2 is a flow chart explaining an example of the operation of the diesel particulate filter, shown in FIG. 1.

Next, an example of operation of the particulate filter according to the present embodiment will be described with reference to FIG. 2. FIG. 2 is a flow chart of assistance in explaining the operation of the particulate filter according to the embodiment.

First, in step S1, checking is made whether or not the clogging of the main filter 12 progresses up to a given level or more, that is, checking is made whether or not an exhaust gas pressure P exceeds a predetermined value P1. If exceeding the predetermined value P1, the step proceeds to step S2, otherwise the step returns to step S1.

In step S2, checking is made whether or not the clogging of the main filter 12 progresses up to an excessive level, that is, checking is made whether or not an exhaust gas pressure P exceeds a second predetermined value P2 (P1≦P2). If exceeding the predetermined value P2, the step proceeds to step S13, otherwise the step proceeds to step S3.

In step S3, checking is made whether or not the engine is in an idling state, that is, whether or not the number of revolutions of the engine is less than a predetermined number. In step S3, if judgement is made that the engine is in an idling state, the step proceeds to step S4, otherwise the step returns to step S1.

In step S4, checking is made whether or not a seat belt is fastened. If in a "worn" state, judgement is made that the vehicle is running, and the step returns to step S1. If the seat belt is removed, open the bypass valve 15 (step S5) and start to energize the main filter 12 (step S6), after which the step proceeds to step S7. When step S6 is executed, the combustion of particulates is carried out in the main filter 12. Since the bypass valve 15 is opened at this time, an amount of exhaust gases passing through the main filter 12 is reduced, the filter 12 is not cooled by the exhaust gases. Further, since the metal wire net or electric heating element is located at the upstream of the exhaust flow, the whole filter 12 is efficiently heated to enable the combustion without unevenness. Further, since the sub-filter 11a is disposed at the downstream portion of the bypass pipe 11, the exhaust gases not filtrated are not exhausted into atmosphere.

In step S7, checking is made whether or not a predetermined time (t1) after starting of combustion has passed. If not, the step returns to step S5. If the predetermined time (t1) has passed, the energization to the main filter 12 is turned off (step S8), and the bypass valve 15 is closed (step S9), after which the step proceeds to step S10 and the energization to the sub-filter 11a is started (step S10). Then the step proceeds to step S11. When step S10 is executed, the combustion of particulates collected in the sub-filter 11a is carried out. At this time, the bypass valve 15 may be slightly opened to supply oxygen to the sub-filter 11a.

In step S11, checking is made whether or not the combustion in the sub-filter 11a was carried out for a predetermined time (t2). When a predetermined time has not been passed, the step returns to step S10. If a predetermined time (t2) has passed, the energization to the sub-filter 11a is turned off (step S12), after which the step returns to step S1.

In step S2, judgement was made that the clogging of the main filter 22 excessively progressed, the bypass valve 15 is immediately opened (step S13) without checking the state of the engine and the state of the seat belt, and the energization to the main filter 12 is started (step S14) is started, after which the step proceeds to step S15. In step S15, checking is made whether or not a predetermined time (t3) after starting the combustion has passed. If not, the step returns to step S13. If a predetermined time (t3) has passed, the energization to the main filter 12 is turned off (step S16) and the bypass valve 15 is closed (step S17), after which the step returns to step S1.

While in the foregoing, a preferred embodiment has been described, it is to be noted that the present invention is not limited to the above-described embodiment but various changes can be made within the scope not changing the gist of the present invention. For example, in the above embodiment, main filters 12 of two coaxially arranged tubes have been employed. However, three or more tubes can be employed. Further, alternatively, after the completion of step S17, cleaning of the sub-filter 11a is carried out for a period of given time, and thereafter the step may return to step S1. Further, instead of carrying out the cleaning of the sub-filter 11a every time the main filter 12 is cleaned, it is so arranged that the sub-filter 11a may be cleaned when times of cleaning of the main filter reached a predetermined value.

Second Embodiment

Figure 3:
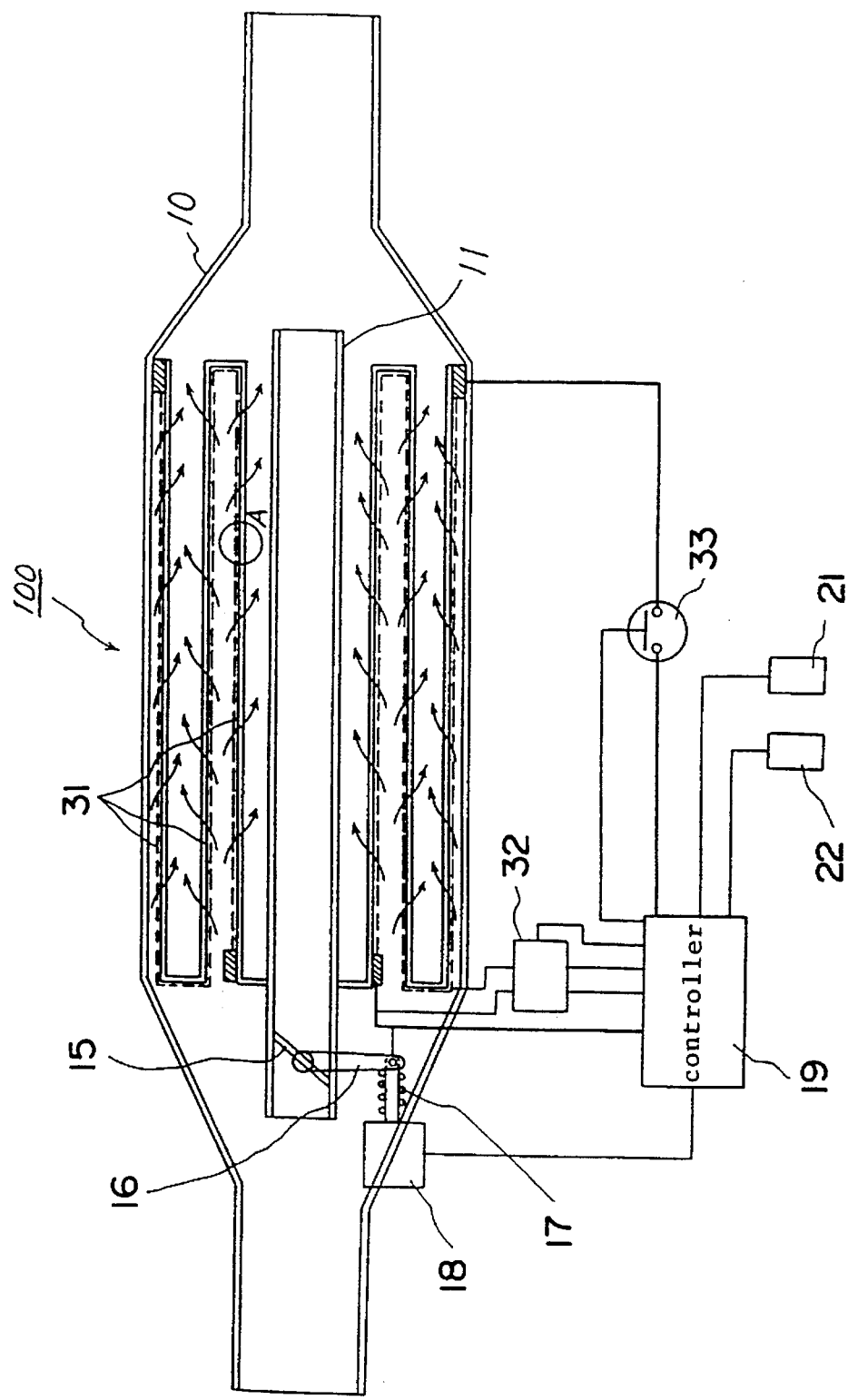
FIG. 3 is a sectional view showing the construction of a diesel particulate filter according to second embodiment of the present invention.

FIG. 3 is a sectional view of a particulate filter according to second embodiment. As shown in FIG. 3, in a particulate filter 100 according to the present embodiment, a cylindrical bypass pipe 11 is disposed in a central portion within a steel filter case 10, and externally thereof is disposed a main cylindrical filter 31 including three tubes of different diameter which are coaxially arranged.

Figure 4:
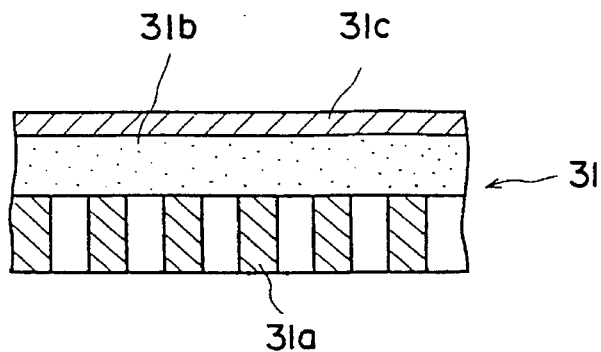
FIG. 4 is a sectional view showing the construction of a main filter in the diesel particulate filter, shown in FIG. 3.

FIG. 4 is a sectional view of a portion indicated at (A) in FIG. 3 of the main filter 31. As shown in FIG. 4, the main filter 31 comprises a heat resistant metal plate 31a having a number of holes, a ceramics fiber composite 31b formed by placing long fibers of ceramics one upon another and sewing them together and a metal wire net 31c of electric resistance as Ni-Cr. The ceramics fiber composite 31b performing a filter function is placed between the heat resistant metal plate 31a and the wire net 31c and the wire net 31c is placed in the upstream of the exhaust flow to receive the exhaust into the ceramics fiber composite 31b.

It is to be noted that a ceramics net-like construction can be used in place of the heat resistant metal plate 31a, and a fiber composite formed of heat resistant metal fiber can be used in place of the ceramics fiber composite 31b.

Returning to FIG. 3, a bypass valve 15 for controlling passage/interception of exhaust gases is provided in the vicinity of an inlet of the bypass pipe 11. The bypass valve 15 is opened and closed by an actuator 18 through a valve operating arm 16a against a force of the spring 17. The operation of the actuator 18 is controlled by a controller 19. Input into the controller 19 are an output signal of a comparator 32 for comparing a electric resistance value between the wire net 31c (see FIG. 4) as an electric heating element and the net-like metal plate 31a with a reference value, and output signals of an idling sensor 22 which detects the number of revolutions of engine and a seat belt sensor 21 for detecting wearing and unwearing of a seat belt. The controller 19 further controls a supply of electric power to the wire net 31c by a control relay 33.

Normally, the bypass valve 15 is closed and thus exhaust gases never pass through the bypass pipe 11. At this time, gases flown from the left side in the drawing are fed between the outer and inner cylindrical filters 31 or between the main filter 31 and the filter case 10, and pass through the main filter 31 as indicated at the arrows and thence are discharged outside of the main filters 31.

The controller 19 receives output signals of the comparator 32 for detecting the resistance value between the wire net 31c as a heater provided on the main filter 31 and the metal plate 31a, output signals of the idling sensor 22 and output signals of the seat belt sensor 21 for detecting a neutral position of a gear in a transmission. The resistance value between the wire net 31c and the metal plate 31a gradually decreases as the particulates are accumulated in the ceramics fiber composite 31b. When the controller 19 judges that the combustion of particles is necessary from these signals, the bypass valve 15 is opened by the actuator 18, and a predetermined amount of current is started to feed to the wire net 31c or an electric heat element through the control relay 33 to burn the particulates collected by the main filter 31.

Figure 5:
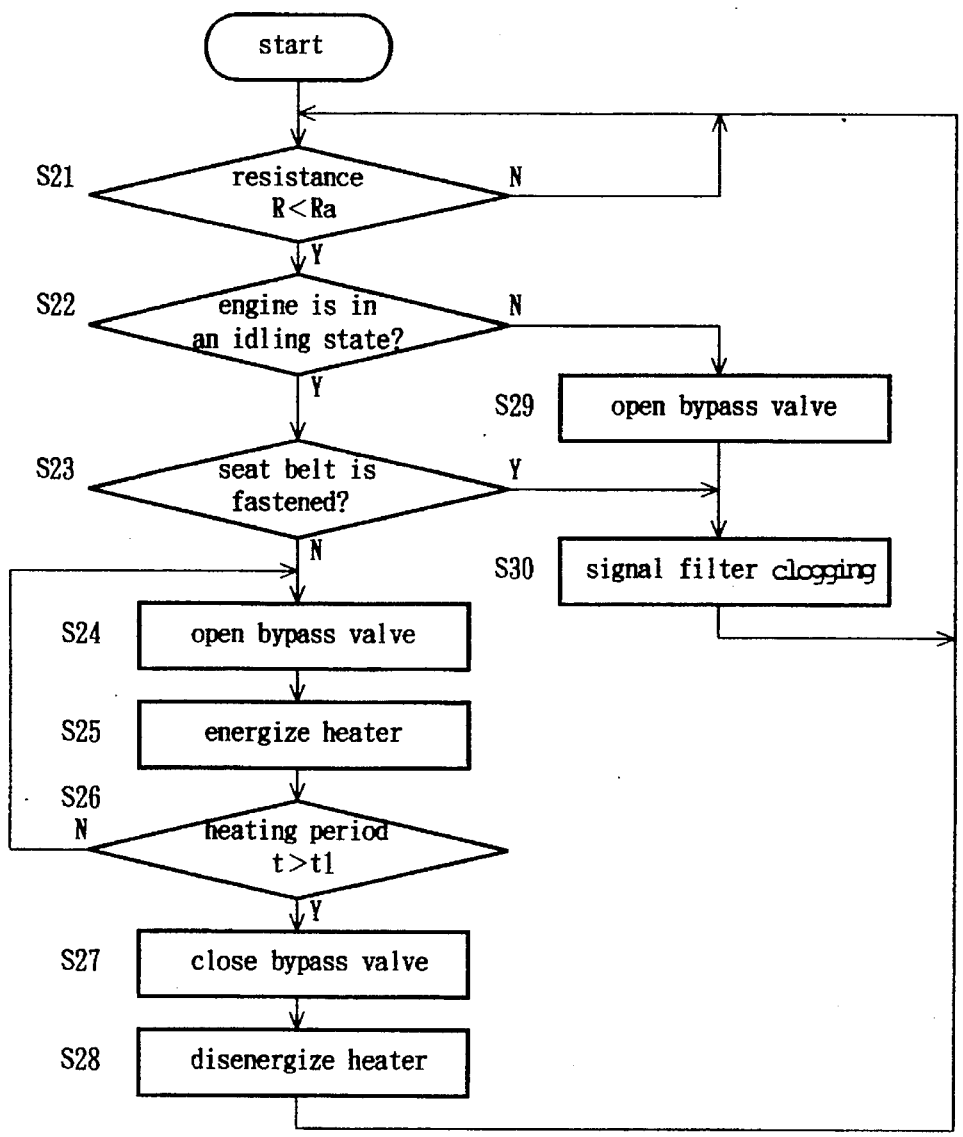
FIG. 5 is a flow chart explaining an example of the operation of the diesel particulate filter, shown in FIG. 3.

Next, an example of operation of the particulate filter according to the present embodiment will be described with reference to FIG. 5. FIG. 5 is a flow chart of assistance in explaining the operation of the particulate filter according to the embodiment shown in FIG. 3.

First, in step S21, checking is made whether or not the clogging of the main filter 33 progresses up to a given level or more, that is, checking is made whether or not particulates collected by the wire net 31c reach a predetermined level or more, that is, an electric resistance value R of the wire net 31c is less than a predetermined value Ra. If the value R is less than the predetermined value Ra, the step proceeds to step S22, otherwise the step returns to step S21.

In step 22, checking is made whether or nor the engine is in an idling state or the gear position of the transmission is in a neutral state, that is, whether or not the number of revolutions of the engine is less than a predetermined number and the vehicle is in a stopped state. In step S22, if judgement is made that the engine is in an idling state, the step proceeds to step S23, otherwise in step S29, the bypass valve 15 is opened. Then, in step S30, a filter clogging signal is generated, after which the step returns to step S21.

The reason why step S29 is provided is that when the combustion of particulates cannot be executed for the reason of the running of vehicle or the like despite the fact that the clogging of the main filter 31 proceeds to a predetermined level or more so that the exhaust gas pressure becomes higher than a the predetermined level, the bypass valve 15 is opened to spread a flow passage of exhaust gases so as not to impair the combustion. Further, step S30 is provided for the reason of informing a driver that since the clogging of the filter occurs, the combustion can be executed quickly as soon as the mode has moved to the combustible situation or environment. Informing means includes a buzzer, a display lamp, etc.

In step S23, checking is made whether or not a seat belt is fastened. If the seat belt is fastened, the program step open the bypass valve 15 (step S24), and start energization to the wire net 31c (step S25), and after this, proceeds to step S26.

By execution of step S25, the combustion of particles is carried out. At this time, the bypass valve 15 is opened so that the amount of exhaust gases which pass through the main filter 31 is few, thus the main filter 31 is not cooled by the exhaust gases. Further, since the electric resistance element 31c is located at upstream of exhaust flow, the entire filter 31 is efficiently heated to enable even combustion.

In step S23, if judgement is made that the seat belt is unworn, the step proceeds to step S30. After a filter clogging signal has generated the step returns to step S21. In step S25, the electric resistance element 31c is started to be energized, and after this, in step S26, checking is made whether or not a predetermined time (t1) has passed after the start of combustion. When not passed, the step returns to step S24. When passed a predetermined time (t1), the bypass valve 15 is closed (step S27) and the energization to the electric resistance element 31c is turned off (step S28), after which the step returns to step S21.

While in the foregoing, a preferred embodiment has been described, it is to be noted that the present invention is not limited to the above-described embodiment but various changes can be made within the scope not changing the gist of the present invention. For example, in the above embodiment, though three co-axial filter tubes as the main filter 31 are employed, four or more tubes as the main filter 31 can be employed. Further, the fiber composite 31b can be constituted by woven textile of metal fiber and/or ceramics fibers.

Effect of the Invention

As described above, in the diesel particulate filter according to the present invention, a bypass pipe for bypassing exhaust gases when particulate burn is provided within a filter case, and the bypass pipe is also made to have a filter function. Therefore, even if the particulate are burnt in the idling state of engine, the filter is not cooled by the exhaust gases to enable the performance of sufficient combustion.

Since the exhaust gases pass through the sub-filter provided on the bypass pipe at this time, the exhaust gases not filtrated are directly not exhausted in the atmosphere.

Further, it is so designed that when the clogging occurs in the filter and engine is in the idling state, the particulate are automatically burnt. Therefore, it is possible to prevent the forgetting of combustion or excessive combustion to always maintain the filter in a good state.

Further, since the combustion of the particulate is carried out during the idling where a large amount of oxygen are contained in the exhaust gases, the efficient combustion can be obtained.

Furthermore, if the clogging of the main filter excessively progresses, screening of the main filter is immediately carried out. It is therefore possible to avoid an engine trouble caused by the clogging of the filter.

When the filter is in the clogging state and in the state where the combustion cannot be made, the driver is informed of such information. Then, it is possible to carry out the combustion quickly under the appropriate environment.

10: filter case
11: bypass pipe
12: main filter
 11a: sub-filter
13: exhaust pipe
14: annular colsed plate
15: bypass valve
16: arm
17: spring
18: actuator
19: controller
20: exhaust pressure sensor
21: seat belt sensor
22: idling sensor
31: main filter
 31a: reinforcing metal plate with holes
 31b: fiber composite
 31c: wire net of electric resistance
32: comparator
33: relay

What is claimed is:

1. A diesel particulate filter for heating, burning and releasing diesel engine exhaust particulates collected therein, comprising:

a filter case, a bypass pipe having a sub-filter, disposed within the filter case, said bypass pipe being provided with an open-close bypass valve in the vicinity of an inlet thereof, a cylindrical main filter having laminating long fibers of ceramics, disposed between said bypass pipe and said filter case, a wire net of electric resistance metal for heating said main filter fastened to a first surface of said main filter for receiving the exhaust, and a reinforcing net plate of a heat resistant metal fastened to a second surface of said main filter for releasing the exhaust.

2. The diesel particulate filter according to claim 1, wherein said main filter is comprised of an inner tube and an outer tube, and annular closing plates are connected between the inlet end of said outer tube and said filter case, between the inlet ends of said inner tube and said bypass pipe, and between the outlet ends of said inner and outer tubes, respectively, and wherein said sub-filter is comprised of a porous metal tube or a porous conductive ceramics tube.

3. A diesel particulate filter according to claim 1, further comprising:

an exhaust pressure sensor disposed in said filter case, and control means for detecting when the exhaust pressure detected by the exhaust pressure sensor exceeds a predetermined value, and opening said bypass valve and energizing said wire net of electric resistance metal to burn the particulates, when the exhaust pressure exceeds the predetermined valve.

4. A diesel particulate filter according to claim 1, further comprising:

means for measuring electric resistance between said wire net for heating and said reinforcing net plate, and control means for driving said bypass valve and said wire net when the electric resistance between said wire net for heating and said reinforcing net plate is less than a predetermined value and the engine is not in an idling state and the gear position of a transmission is in neutral, to open said bypass valve and energize said wire net.

5. A diesel particulate filter according to claim 4, wherein said sub-filter is comprised of a porous metal tube or a porous electric conductive ceramic tube, having a porous passage therein with a diameter which is larger than that of said main filter, and wherein said control means is provided so that after the particulates collected in said main filter are burned, said bypass valve is closed, and said sub-filter is energized to burn the particulates collected thereby.

6. A diesel particulate filter according to claim 4, wherein said sub-filter is comprised of a porous metal tube or a porous electric conductive ceramics tube, having a porous passage therein which is larger than that of said main filter, and wherein said control means is provided so that when the electric resistance between said wire net for heating and said reinforcing net plate is less than a predetermined value, and the engine is not in an idling state or the seat belt is fastened, a filter clogging signal for a vehicle driver is generated and the bypass valve is fully opened.

* * * * *